United States Patent [19]

Moeller

[11] Patent Number: 4,604,551
[45] Date of Patent: Aug. 5, 1986

[54] CYCLOTRON RESONANCE MASER SYSTEM WITH MICROWAVE OUTPUT WINDOW AND COUPLING APPARATUS

[75] Inventor: Charles P. Moeller, Del Mar, Calif.

[73] Assignee: GA Technologies Inc., San Diego, Calif.

[21] Appl. No.: 622,672

[22] Filed: Jun. 20, 1984

Related U.S. Application Data

[63] Continuation-in-part of Ser. No. 517,570, Jul. 26, 1983, Pat. No. 4,523,127, which is a continuation-in-part of Ser. No. 463,144, Feb. 2, 1983, abandoned.

[51] Int. Cl.⁴ .............................................. H01J 25/00
[52] U.S. Cl. ..................................... 315/4; 333/24 R; 333/230; 372/2; 315/5; 315/5.29; 315/5.31; 315/39; 330/4.5
[58] Field of Search ............... 315/3, 4, 5, 5.29, 5.31, 315/39, 5.32; 372/2; 331/79, 81; 330/4.5; 333/230, 251, 24 R

[56] References Cited

U.S. PATENT DOCUMENTS

| | | | |
|---|---|---|---|
| 4,434,387 | 2/1984 | MacMaster et al. | 315/39 |
| 4,496,876 | 1/1985 | Young | 315/4 |
| 4,523,127 | 6/1985 | Moeller | 315/4 |

OTHER PUBLICATIONS

Bekefi, G., "Rippled-Field Magnetron," Appl. Phys. Lett., vol. 40, No. 7, 1 Apr. 1982, pp. 578-580.

Primary Examiner—Saxfield Chatmon
Attorney, Agent, or Firm—Fitch, Even, Tabin & Flannery

[57] ABSTRACT

A cyclotron resonance maser system includes coaxial coupling between coaxial wave guides. Such coupling is provided between an outer coaxial waveguide through which a gyrotron electron beam passes in generating or amplifying microwaves and an inner coaxial waveguide terminating in an annular window. The coupling separates the microwaves from the electron beam before the collector region of the gyrotron so that the collector dimensions are not related to, and hence restricted by, the wavelength of the output microwaves. The particular preferred coupling includes substantially axial slots in the common wall between the respective waveguides which slots provide selective coupling between the waveguides in the desired modes and limiting mode conversion. The coupling is preferably between a $TE_{On}$ or $TE_{ml}$ mode in the outer input waveguide and a $TE_{On'}$ mode in the inner, output waveguide, n and n' being integers greater than 1. A preferred resonant cavity limits the generated microwaves to a $TE_{ml}$ mode. Partial reflection and feedback from the inner waveguide stabilizes the input mode.

44 Claims, 6 Drawing Figures

CYCLOTRON RESONANCE MASER SYSTEM WITH MICROWAVE OUTPUT WINDOW AND COUPLING APPARATUS

This is a continuation-in-part of copending application Ser. No. 517,570, filed July 26, 1983, now U.S. Pat. No. 4,523,127, which is in turn a continuation-in-part of application Ser. No. 463,144, filed Feb. 2, 1983, now abandoned, and copending therewith.

BACKGROUND OF THE INVENTION

1. Field of the Invention

The present invention relates generally to the transfer of microwave energy and more particularly to the transfer of energy from a cyclotron maser. It relates to the coaxial coupling of microwave energy between a pair of coaxial waveguides and to the transfer of microwave energy from a coaxial waveguide through an annular window. The invention has particular application to microwaves of very high power, as for use in radar.

2. Description of the Prior Art

High power microwaves have been produced by cyclotron resonance maser devices, such as gyrotron amplifiers and oscillators wherein energy is transferred from an electron beam to an electromagnetic wave. The principles of various cyclotron resonance devices, and of gyrotrons in particular, are well known. See, for example, Flyagin, V. A., et al., "The Gyrotron," IEEE Transactions on Microwave Theory and Techniques, Vol. MTT-25., No. 6, June 1977, pp. 514–521; Hirschfield, J. L., et al., "The Electron Cyclotron Maser—An Historical Survey," IEEE Transactions on Microwave Theory and Techniques, Vol. MTT-25, No. 6, June 1977, pp. 522–527; Symons, Robert S., et al., "An Experimental Gyro-TWT," IEEE Transactions on Microwave Theory and Techniques, Vol. MTT-29, No. 3, March 1981, pp. 181–184; Ganguly, A.K., et al., "Self-consistent large signal theory of the gyrotron travelling wave amplifier, "Int. J. Electronics", Vol. 53, No. 6, 1982, pp. 641–658; Ganguly, A. K., et al., "Analysis of two-cavity gyroklystron," Int. J. Electronics, Vol. 51, No. 4, 1981, pp. 503–520; and Baird, J. Mark, "Survey of Fast Wave Tube Developments," Technical Digest of International Electron Devices Meeting sponsored by IEEE, Washington, D.C., 1979, pp. 156–163.

As set forth in these references, in general the various cyclotron resonance maser devices involve an electron beam moving in an axial direction in an axial magnetic field. The electrons in the beam have a substantial motion transverse of axial and hence move generally helically along magnetic lines of flux. The electrons move through a waveguide or resonant cavity containing travelling or standing microwaves. The electrons interact with the microwaves, initiating phase bunching of the electrons. The bunched electrons radiate microwave energy, which is extracted through a window separating the encoded electron beam device from the atmosphere.

The spent electrons are then collected, generally on a hollow circular tube collector. The collector tube may serve as an output waveguide for the microwaves, and the window is ordinarily a circular dielectric disk in the end of the tube. The microwaves pass through the window with some absorption in the dielectric. See Flyagin, "The Gyrotron", supra at pp. 514–521, particularly FIG. 1, where microwave energy is extracted through an end window.

The average power available from such an electron beam device of the prior art at millimeter wavelengths is limited primarily by the heating of the vacuum window at the output of the respective device and the dissipation capabilities of the beam collector of the respective device. The vacuum window problem consists of effectively removing heat generated by dielectric losses in the window material in order to prevent excessive thermal stresses and consequent cracking of the window and the leaking of air into the electron beam device. The problem with the beam collector in prior art devices is the limitation imposed on its size, and hence dissipation capability, by the use of the beam collector as part of the output waveguide.

Both of these problems have become important with the development of the gyrotron (or cyclotron maser), the interaction structure of which is capable of generating megawatts of power at millimeter wavelengths. This capability exceeds the power handling capability of the prior window designs, which consist of a single edge cooled disk or a pair of disks having between them a flowing dielectric fluid as a coolant. Both these designs have power limits, independent of their dimensions, which are intrinsic to the thermal and dielectric properties of the available materials, and which decrease rapidly with increasing frequency. The present limit is about 200 kW at 60 GHz. The beam dissipation capability of the collectors of prior art gyrotrons is likewise a decreasing function of frequency. This is because the microwave power generated in the interaction region of the gyrotron continues to travel with the electron beam, out of the interaction cavity through a taper up to the collector diameter, the collector being essentially a hollow cylinder. In order to maintain the output power in a single mode (the one in which it was generated), the taper must follow a prescribed smooth curve, and the collector wall must maintain a high degree of circularity and straightness. With increasing frequency, the mechanical tolerances become more severe, and the required taper length increases (as the square of the frequency for a fixed diameter). The taper requirements are already a problem for 200 kW at 60 GHz.

SUMMARY OF THE INVENTION

In keeping with one aspect of this invention, coaxial coupling is provided between coaxial wave guides. In particular such coupling is provided between an outer coaxial waveguide through which a gyrotron electron beam passes in generating or amplifying microwaves and an inner coaxial waveguide terminating in an annular window. The coupling separates the microwaves from the electron beam before the collector region of the gyrotron so that the collector dimensions are not related to, and hence restricted by, the wavelength of the output microwaves. The particular preferred coupling includes substantially axial slots in the common wall between the respective waveguides which slots provide selective coupling between the waveguides in the desired modes and limiting mode conversion. The coupling is preferably between a $TE_{0n}$ or $TE_{m1}$ mode in the outer input waveguide and a $TE_{0n'}$ mode in the inner, output waveguide, n and n' being integers greater than 1. (The notation is that of Marcuvitz in N. Marcuvitz, Waveguide Handbook, McGraw-Hill, 1951, p. 77).

In a preferred embodiment an annular electron beam from an electron gun is directed by a magnetic field so that beam electrons pass through an annular beam tunnel into an annular resonant microwave cavity. The beam tunnel is dimensioned to prevent propagation of the desired cavity mode and typically contains lossy elements to prevent it from acting as a cavity. The beam electrons entering the cavity encounter a microwave field in the cavity which initiates phase bunching of the electrons according to the well known principles of the cyclotron maser. As the electrons proceed through the cavity, they phase bunch and give up rotational energy to electromagnetic fields in the cavity. The cavity is terminated in a taper into a waveguide having a lower cutoff frequency than the cavity, thereby reducing the field amplitude and the axial phase velocity of the output wave and thereby ending the interaction. Beyond the taper is the coupling region, which couples the microwave output into an inner annular waveguide while allowing the electrons to proceed to an electron collector. The microwaves proceed in the inner waveguide to the annular vacuum window, which is the output of the device.

Other aspects and advantages of the invention will become evident from consideration of the following detailed description, particularly when taken in conjunction with the accompanying drawings.

DETAILED DESCRIPTION

Gyrotron

Figure 1:
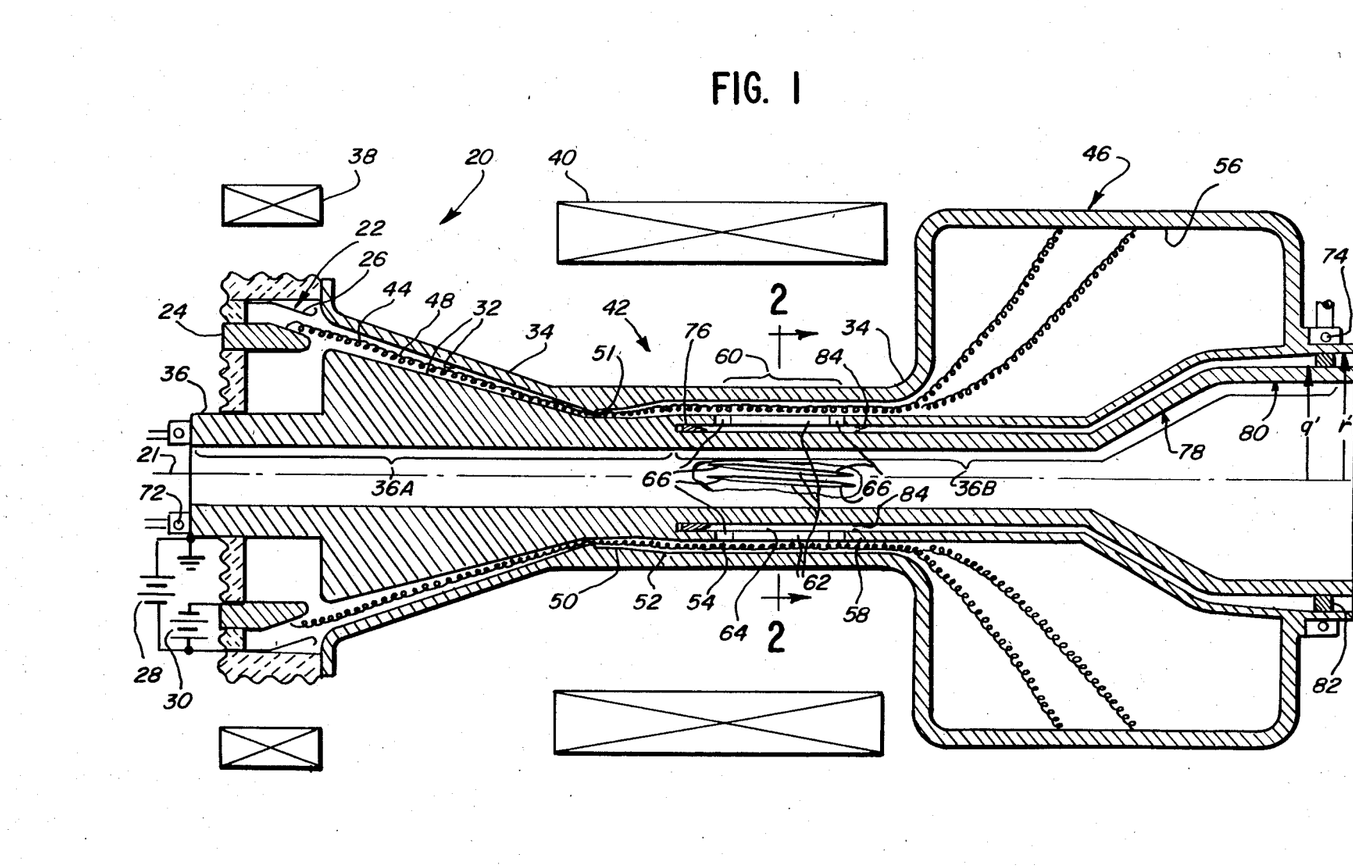
FIG. 1 is an axial sectional view of a cyclotron resonance maser system according to the present invention, including a slotted coupling between coaxial waveguides and an annular end window, with a portion broken away to show the coupling in elevation, and with the section slightly skewed to pass centrally through respective slots in the coupling and with electrical and magnetic components shown diagrammatically.

In a preferred embodiment of the invention illustrated in FIG. 1, a gyrotron 20 includes an assembly of components disposed successively along a common axis 21. A magnetron injection gun 22 is comprised of a conical cathode 24 and a surrounding gun anode 26. The gun anode 26 is held negative relative to ground by a first d.c. power supply 28. The cathode is held further negative by a second d.c. power supply 30. The final anode 32 is formed in part by the housing 34 of the gyrotron 20 and in part by a central member 36 and is at ground potential. Hence, the anode 32 is positive relative to the magnetron injection gun 22. The magnetion injection gun 22 is immersed in a constant magnetic field produced by an electron gun magnet 38. A further constant magnetic field is applied by a main gyrotron magnet 40 disposed around a necked portion 42 of the gyrotron 20. The resulting magnetic field lines are substantially parallel to the axis of the gyrotron 20 in the necked portion 42 and expand into the beam tunnel 44 formed by the final anode 32 and into the magnetron injection gun 22 and a collector 46 formed by the housing 34.

According to well known gyrotron principles as set forth in the above-noted references, electrons are emitted from the cathode 24 and are accelerated by the potential on the gun anode 26. The magnetic fields prevent the electrons from reaching the gun anode 26 and direct the electrons in an annular beam 48. The respective electrons have substantial motion transverse to the beam direction. They generally follow the lines of magnetic flux, spiralling around them. The lines of magnetic flux are directed to cause the electron beam 48 or at least a substantial portion thereof, to move into and through the beam tunnel 44 and necked portion 42 without striking the tube housing 34 or the central member 36.

Guided by the lines of flux the electron beam 48 passes through the beam tunnel 44 and enters a cavity 50 through a cutoff orifice 51, passes through the cavity 50 and a tapered section 52 into an outer coaxial waveguide 54 and continues into the collector 46. The expanding magnetic field in that region carries the beam into the walls 56 of the collector 46. The cavity 50 and the tapered section 52 are defined by the housing 34 of inner radius b and the first part 36A of the central member 36 of outer radius a, a and b varying over the length of the cavity 50 and the tapering section 52 in the embodiment of the invention shown in FIG. 1, as discussed below. The waveguide 54 is defined by the housing 34 of inner radius b and an intermediate coaxial member 58 of outer radius a, a and b being constant over the length of the waveguide 54 up to the collector 46.

In the cavity 50 the electron beam 48 gives up transverse kinetic energy to electromagnetic modes of the cavity according to the well known principles of the cyclotron maser. The fraction of kinetic energy transferred to electromagnetic waves, which determines the device efficiency, depends on which of the possible cavity modes grows to saturation when the oscillations start. Two aspects of the present invention relate to selection of the operating mode, as discussed further below.

The microwaves generated in the cavity 50 and the spent electron beam 48 pass into the tapered section 52, which defines the end of the cavity, into the outer coaxial waveguide 54, continuing to a coupling section 60. In the coupling section the wall currents associated with the microwaves in the waveguide 54 couple through slots 62 in the intermediate member 58 into an inner coaxial waveguide 64, defined by the second portion 36B of the central member 36 and the intermediate member 58, while the spent electron beam continues into the collector 46.

Figure 2:
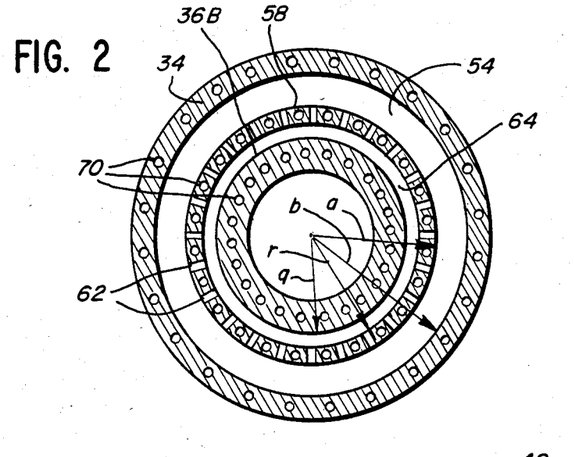
FIG. 2 is a transverse sectional view through the coupling section of the cyclotron resonance maser system shown in FIG. 1, taken along line 2—2 of FIG. 1.

FIG. 2 is a cross-sectional view of the coupling region 60 shown in FIG. 1. It shows coolant channels 70 in each of the housing 34, the intermediate coaxial member 58 and the central member 36. Coolant is circulated in these channels over substantially the entire length of the gyrotron 20 by way of coolant supplied at manifolds 72 and 74 in order to cool the respective members 34, 58 and 36. As shown in FIG. 2, the coupling section 60 is formed of coaxial members defining coaxial waveguides. The housing 34 and the intermediate coaxial member 58 define the outer waveguide 54 of outer radius b and inner radius a. The intermediate coaxial member 58 and the central member 36 define the inner coaxial waveguide of outer radius r and inner radius q.

With the apparatus shown in FIG. 1, the manner in which the microwaves are separated from the electron beam 48 allows the use of a collector 46 which is large compared to those in prior designs in which the microwave output passes through the collector, which must then be limited in size to avoid mode conversion. The combination of a completely coaxial geometry as shown in FIG. 1 with an annular window design as described below is particularly advantageous because it allows the generated microwave power that is separated from the electron beam 48 to be transferred radially inward to a single waveguide. Furthermore, this geometry avoids the potentially serious problem of creating unintended resonances which would occur if the central coaxial member were interrupted, i.e., if a coaxial output region were combined with hollow cavities.

There are two types of incident modes that are to be initiated in accordance with this invention, $TE_{0n}$ coaxial circular electric modes, where n is an integer greater than 1, and $TE_{m1}$ coaxial modes, where m is an integer substantially greater than 1. The output mode in either case is to be a $TE_{on'}$ circular electric mode, where n' is an integer greater than 1, slightly different structures being required for the two incident modes. The $TE_{0n}$ modes (n greater than 1) have purely azimuthal electric fields and wall currents, while the $TE_{m1}$ modes have purely radial electric fields, the $TE_{01}$ mode being the familiar TEM coaxial mode, which has purely axial wall currents.

Figure 3:
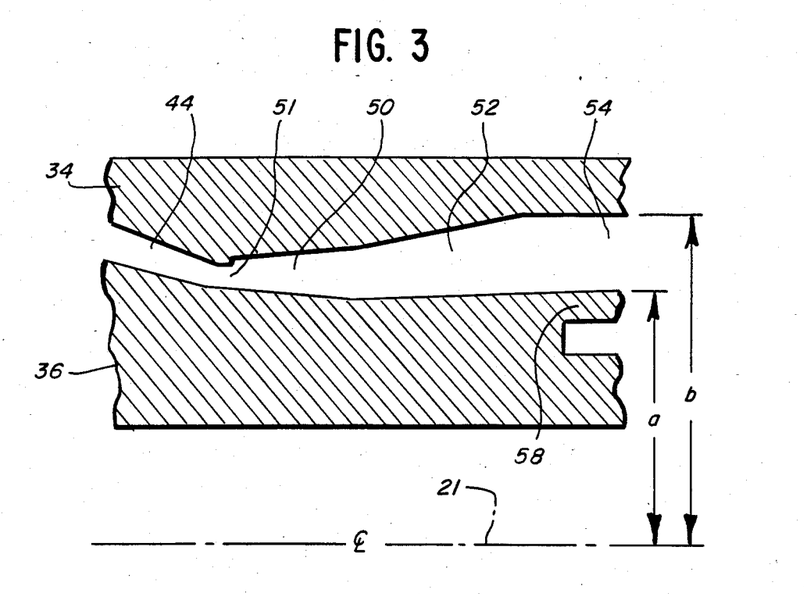
FIG. 3 is an enlarged view of the microwave cavity and tapered section of the system shown in FIG. 1 as suitable for initiating $TE_{m1}$ modes.

The structure of FIGS. 1 and 3 is designed for initiating $TE_{m1}$ coaxial modes. The shape of the cavity 50 and the tapered section 52 are of primary influence in determining the resonance and stability of a particular $TE_{m1}$ mode and frequency. For $TE_{m1}$ modes, the determining factor is the average radii of the surfaces defining the cavity, that is $(b+a)/2$. This is the average radius of a section transverse to the axis, herein referred to as a transverse section. The respective defining surfaces of the members 34 and 36 are equally and oppositely tapered to maintain $(b+a)$ constant over the length of the cavity. Thereafter, in the tapered section 52 the factor $(b+a)$ is increased by increasing both dimensions b and a to the internal dimensions of the outer waveguide 54. The tapered section 52 thus defines a termination of the cavity 50 and provides impedance matching to the waveguide 54. The cutoff orifice 51 provides a step down in average diameter $(b+a)$ in going from the cavity 50 toward the beam tunnel 44. This cuts off the resonant mode developed in the cavity 50 from the beam tunnel 44 and prevents any substantial electron beam-microwave interaction in the beam tunnel. The increase in the factor $(b+a)$ in going to the waveguide 54 provides a lower cutoff frequency in the waveguide, preferably at least 25% lower, and substantially increases the group velocity over that in the cavity 50.

Another aspect of the invention concerns the tapering of the coaxial output cavity 50 and its associated tapered section 52. If the difference between the outer and inner radii $(b-a)$, is kept less than $\lambda_0$, the free space wavelength, only two sets of modes can propagate in the cavity, the $TE_{m1}$ modes and the $TE_{m2}$ modes. For the purposes of this invention, it is preferred that the gyrotron oscillate in a $TE_{m1}$ mode rather than a $TE_{m2}$ mode. This can be achieved by tapering $(b-a)$ in the cavity, $(b-a)$ increasing monotonically towards the output, while keeping $(b+a)$ constant. The tapering prevents this open waveguide from being a resonator for the $TE_{m2}$ modes, because the cutoff wave number $$k_{\perp m2} \simeq \left[ \frac{\pi^2}{(b-a)^2} + \frac{4m^2\pi^2}{(b+a)^2} \right]^{\frac{1}{2}} \quad (1)$$

so that $k_{\perp 02}$ depends very strongly on $(b-a)$ when $(b-a)<<b$, as would be the case of interest, and decreasing $k_{\perp 02}$ monotonically toward the waveguide output prevents the open waveguide from being a resonator. Conversely, $$k_{\perp m1} \simeq 2m/(b+a), \quad (2)$$

so that if $(b+a)$ is held constant while $(b-a)$ is tapered, $k_{\perp m1}$ will be constant, and the resonant frequency will be $$\omega \simeq ck_{195\ m1}, \quad (3)$$

while the Q will be approximately $$Q \simeq 4\pi l^2/\lambda_0^2, \quad (4)$$

l being the length over which $k_{\perp m1}$ is constant, and $$\lambda_0 \simeq 2\pi/k_{\perp m1} \quad (5)$$

where $\lambda_0$ is free spae wavelength and c is the speed of light.

Figure 4:
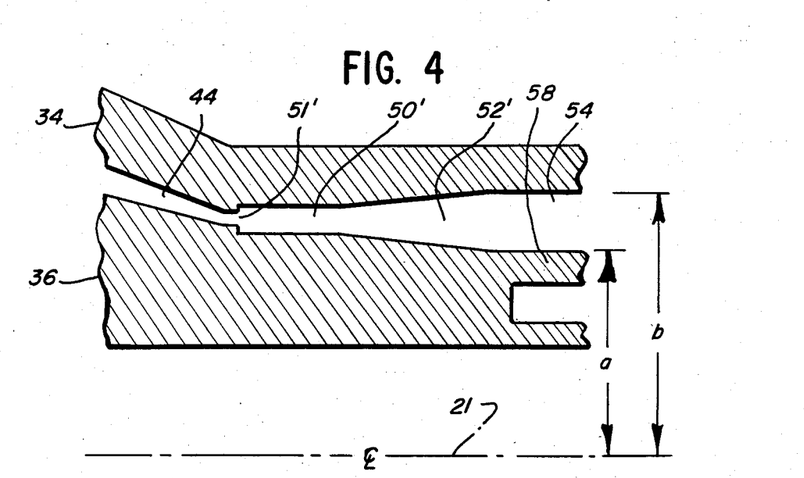
FIG. 4 is an enlarged view of an alternative microwave cavity and tapered section of the system shown in FIG. 1 as suitable for initiating $TE_{0n}$ modes.

The structure is slightly modified for initiating $TE_{0n}$ (n greater than 1) modes and coupling such modes to the output waveguide 64. The cavity, tapered section and slots as shown in FIG. 1 are modified to the shapes shown in FIGS. 4 and 5. FIG. 4 shows the shape of a modified cavity 50' and a modified tapered section 52' for a $TE_{0n}$ (n greater than 1) mode. For $TE_{0n}$ modes, the determining factor is the difference between the defining radii $(b-a)$. The difference $(b-a)$ is maintained constant over the length of the cavity 50 to establish the mode. The difference increases over the tapered region 52' by symmetrically expanding the tapered region to match the outer waveguide 54. As in the cavity 50 and tapered section 52 shown in FIG. 3, the tapered section 52' thus defines the termination for the cavity 50' and provides impedance matching to the waveguide 54. The cutoff orifice 51' in this embodiment is symmetric in respect to the cavity 50' and provides a step up in the difference $(b-a)$ in going from the beam tunnel 44 to the cavity 50'. Symmetry makes it least likely to create mode conversion. As with the orifice 50, this cuts off the resonant mode developed in the cavity 50' from the beam tunnel 44 and prevents any substantial electron beam-microwave interaction in the beam tunnel. The increase in the factor $(b-a)$ in going to the waveguide 54 provides a lower cutoff frequency in the waveguide, preferably at least 25% lower, and increases the group velocity over that in the cavity 50'. The $TE_{02}$ mode is a preferred resonant mode.

Beam-Microwave Separation

Figure 5:
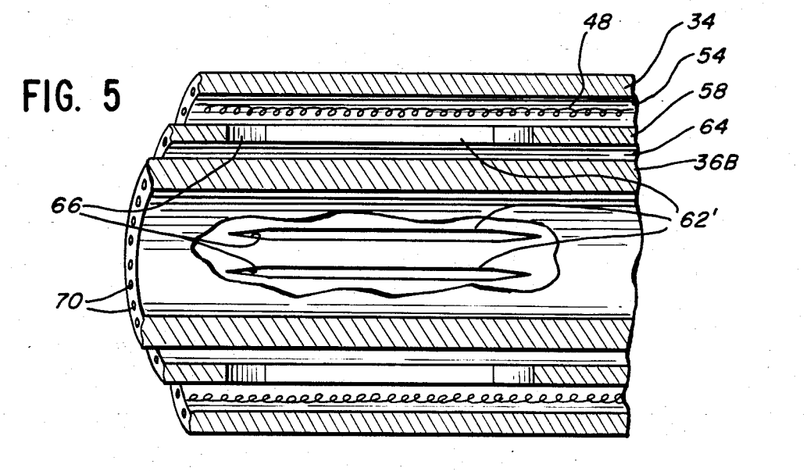
FIG. 5 is a partial axial sectional view of an alternative coupling section for the system shown in FIG. 1 as suitable for coupling incident $TE_{0n}$ modes.

As these waves propagate in the outer coaxial region 58, they encounter the coupling region 60, which includes a continuation of the outer coaxial waveguide 54, except that there is an azimuthally symmetric array of slots 62 in the common coaxial wall 58, the slots being substantially axial but having a slight helicity for rotating $TE_{m1}$ modes (FIG. 1), the helicity depending on the incident mode. For $TE_{0n}$ modes, the slots 62' are preferably purely axial (FIG. 5). The slots 62 have a taper 66 at each end to minimize reflections and conversion to higher $TE_{mn}$ coaxial modes. The axial slots 62 interrupt the azimuthal wall currents of the microwaves, the currents being forced to flow through the slots into the inner coaxial waveguide 64. If the slots 62 are sufficiently numerous and of proper length, and the dimensions a, b, r, and q are chosen appropriately, the microwave power can be almost completely transferred from the outer coaxial waveguide 54 to the inner coaxial waveguide 64 into a circular electric $TE_{0n'}$ mode travelling to the right as shown in FIG. 1, where the number n' is an integer greater than 1 as determined by the choice of r−q relative to the dimensions b and a. Any energy travelling in the other direction is damped by an absorber 76. The dimension (r−q) determines the phase velocity of the microwaves in the waveguide 64 and is predetermined to match the wave phase velocity in the waveguide 54. A preferred output mode is $TE_{02}$.

The dimension a−r, the thickness of the intermediate member 58, is determined from the cutoff wavelength of the mode going through the coupling, being made an odd multiple of one-fourth thereof.

The number of slots 62 is made equal to m for coupling from $TE_{m1}$ modes.

The microwaves continue to the right in the inner coaxial waveguide 64, which expands in major diameter in an expanding tapered section 78, which is well beyond the region where the static magnetic field lines of the gyrotron magnet 40 have expanded toward the collector walls 56, carrying the spent electrons with them. Such a taper can be made quite short, provided the spacing of the members 36 and 58 is maintained, because circular symmetry prevents coupling to non-symmetric modes, and if the spacing is less than $\lambda_0$, where $\lambda_0$ is the wavelength of the microwaves in free space, there is no other symmetric mode to which power can be transferred. Even if the spacing is several times $\lambda_0$, the expansion can be very abrupt compared to a hollow taper of such diameter, because the transition must be gradual in relation to the difference of the wave number of the desired mode and the nearest (in wavenumber) coupled mode. Provided the spacing is less than $2\lambda_0$, the symmetric modes are widely spaced in wavenumber, so that purely radial perturbations can be made over much shorter distances than for a large hollow waveguide of the same diameter, where the symmetric modes are much more closely spaced.

Similarly, in a succeeding tapered section 80, the spacing between the members 36 and 56 is increased, but is still typically less than $2\lambda_0$, to final spacing (r'−q'), where r' and q' are, respectively, the optimized outer and inner radii of an annular ceramic window 82. This annular window is hermetically sealed to the walls of the inner coaxial waveguide 64 by conventional metalizing and brazing techniques. The window is edge cooled at both its inner and outer edges from the respective manifolds 72 and 74 through the coolant channels 70. The advantage of such an annular window when edged cooled is that unlike a solid disk, the maximum temperature and stress is proportional to (r'−q') when (r'−q')<<r' for a given microwave power and dielectric loss. For a solid disk the maximum temperature and stress are independent of radius. Typical values are described below. The annular window 82 could likewise be adapted to face cooling using a pair of windows. In that case, the vastly smaller stress due to the coolant (and atmospheric) pressure allows a much thinner window to be used for an annular window than for a solid disk, thereby reducing the heat input for a given microwave power.

The dimension (r−q) is determined from the desired coupling mode to assure coupling into the desired $TE_{0n}$ mode (n being an integer greater than 1, e.g., 2). Increasing the inner diameter of the intermediate member 58 and, hence, the outer diameter of the annular window 82 increases the heat transfer area at the edge and, hence, better dissipates the heat generated by losses in the dielectric of the window. The minor diameter of the window (r'−q') need not be changed from the waveguide dimension (r−q); however, it can be increased without disturbing the mode, for the mode is already well established before the microwaves reach the window. It may be desirable to increase the minor diameter to avoid electrical breakdown between the members 36 and 58 by reducing the electric field. This would be no problem in vacuum, but could be a problem on the other side of the window, which could be in air at atmospheric pressure.

For maximum transmission of power, the thickness of the window 82 should be substantially equal to integral multiples of half wavelengths of the microwaves in the material of the window.

The coupling of two waveguides by means of apertures in a common wall has been analyzed in a general fashion by many authors, a good example being S. E. Miller, "Coupled Wave Theory and Waveguide Applications," Bell. Sys. Tech. J., Vol. 33, May 1954, p. 661-719. It is known that power can be almost completely transferred from one waveguide to the other provided the phase velocity of the mode of interest in each of the two guides be the same, and the coupling region be of a specific length, depending on the coupling strength. If each waveguide can support more than one mode, which is the case of interest here, additional conditions must be satisfied for efficient transfer. The case of an incident circular electric $TE_{0n}$ mode (n greater than 1) can be analyzed more precisely because of the mode's high degree of symmetry. The analysis can then be extended to the case of an incident $TE_{m1}$ mode, which has a strong angular dependence.

For the $TE_{0n}$ case, the slots 62' are axial, in order to interrupt the purely azimuthal wall currents. The coupling slots will in general provide coupling between the desired mode in the outer coaxial region and all $TE_{m'n'}$ modes in both waveguides that satisfy m'=pM, where M is the number of uniformly spaced coupling slots, and p is an integer including 0, where the input mode is the $TE_{on}$, which has no angular dependence, and n' and n are integers greater than 1. The coupling then will be only to $TE_{0n'}$, $TE_{Mn'}$ $TE_{2Mn'}$, etc., and if M is chosen sufficiently large, the difference in propagation constants $\beta_{Mn'}-\beta_{0n}$, $\beta_{2Mn'}-\beta_{0n}$ times the coupling length L will be >>$2\pi$, ensuring that little net power will be transferred to those modes. Coupling to all the $TE_{0n'}$ modes also occurs, but $(\beta_{0n'}-\beta_{0n})L>>2\pi$ for all but the desired n' for reasonable choices of (r−q) and (b−a), especially for (r−q) and (b−a) of the order of $\lambda_0$, the free space wavelength, as would be the case of interest here.

L varies as 1/(Mw), w being the slot width, so that L can be made arbitrarily large, ensuring arbitrarily good discrimination against undesired modes. The efficiency $\eta$ of transfer between waveguides, considering only one mode in each is $$\eta = 1/\left[1 + \left(\frac{\Delta\beta L}{\pi}\right)^2\right] \quad (6)$$

where $\Delta\beta$ is the mismatch in propagation constant between the input mode and the desired output mode. Because $\Delta\beta$ cannot be made arbitrarily small due to manufacturing tolerances, if the coupling is excessively weak, making L large, the efficiency will suffer.

A good estimate of the coupling length L can be obtained using a planar approximation for the case of (r−q) and (b−a)<<r. Furthermore, the presence of infinitely thin radial metallic partitions spaced midway between pairs of slots would not alter the boundary conditions, so that only one such section need be considered. The problem is then reduced to that of two rectangular waveguides coupled by a long slot in a common wall, the electric fields (of the uncoupled guides) being parallel to the wall containing the slot. The waveguides have widths (b−a) and (r−q), the common wall being (a−r) thick. The waveguide "heights" are, respectively, $$h_1 = \pi(a+b)/M \quad (7)$$

and $$h_2 = \pi(r+q)/M \quad (8)$$

where the slot height is w. The relative impedances of the three sections are $h_1$, $h_2$ and w, respectively, and by use of the transverse resonance method, the coupling coefficient between the two guides can be obtained. (This ignores discontinuity capacitances at the step junctions, but their inclusion mainly affects the slot thickness (a−r).)

As an example, let the incident mode in the outer and inner coaxial regions both be the $TE_{02}$ coaxial mode (so that in the planar approximation the mode is the fundamental $TE_{10}$ mode in a rectangular waveguide). Then we must have $$(b-a) = (r-q) = d, \quad (9)$$

and for minimum perturbation of the waveguides by the slot, $$(a-r) = (b-a)/2 \quad (10)$$

or an odd multiple thereof.

$$L = \left(\frac{h_1 h_2}{w^2} + \frac{h_1 + h_2}{2w}\right)^{\frac{1}{2}} \frac{\pi d}{2} \left[\left(\frac{2d}{\lambda_0}\right)^2 - 1\right]^{\frac{1}{2}} \quad (11)$$

To see the effect of tolerances on efficiency, suppose the width of one of the guides deviates from d by $\Delta d$.

Then $\Delta\beta$, the difference in propagation constances is given by $$\beta\Delta\beta \simeq (\pi/d)^2 \Delta d/d, \quad (12)$$

or $$\Delta\beta \simeq (\Delta d/d)\pi/d[(2d/\lambda_0)^2 - 1]^{\frac{1}{2}} \quad (13)$$

The efficiency $\eta$ is:

$$\eta = 1/[1 + (\Delta d/d)^2(\eta^2/4)[h_1 h_2/w^2 + (h_1+h_2)/2w]] \quad (14)$$

using Equation (6). Because it is desirable to keep $d < \lambda_0$ to avoid the next higher symmetric mode, and $\lambda d$ is at least 0.001 inches, the efficiency is controlled by $h_1/w$ and $h_2/w$, a reasonable value of which is 1/5, if the slot is not to contain excessive stored energy.

As a numerical example, for 94 GHz, $\lambda_0 = 0.126$ inches, let d=0.120 inches, then for $h_1/w = 1/5 \simeq h_2/w$, L=1.70 inches, and $\eta = 96\%$ if $\Delta d = 0.002$ inches, which is quite acceptable.

The propagation of the $TE_{m1}$ modes is governed by the dependence $$\beta_{m1} = (k_0^2 - k_{1 95}{}^2)^{\frac{1}{2}}, \quad (15)$$

where $k_0 = 2\pi/\lambda_0$ and $k_\perp = m/R$, where R=(a+b)/2. This is in contrast to $k_\perp = \pi/(b-a)$ for the $TE_{02}$ mode.

In order to couple a $TE_{m1}$ mode to a symmetric mode, it is necessary to use m equally spaced slots. For stationary $TE_{m1}$ modes, Equation (11) is still valid for the coupling length L, provided $h_1$ is redefined as $h_1 = 2(b-a)$. The phase matching condition is (r−q)=(a+b)/2m. (b−a) is a free parameter in this case, since the phase matching condition is no longer dependent on it.

For a rotating wave, the straight slots would only couple half the power from waveguide 54 to waveguide 64. This can be avoided by giving the slots 62 a slight helicity, defined by $\theta = \alpha z$. This breaks the degeneracy of the right and left hand rotating waves as seen in waveguide 64 through the slots 62, the splitting in wave number being 2 $\alpha m$. Adequate discrimination will be obtained when 2 $\alpha mL$ is at least $2\pi$, which for large m requires only a slight twist so that the coupling is still primarily through $B_z$. The rotating wave has only $(2)^{-\frac{1}{2}}$ the $B_z$ at the slots compared to a stationary wave of the same power, thereby increasing L by $(2)^{\frac{1}{2}}$ compared to the value from Equation (11). The helicity alters the phase matching condition slightly, and partially offsets this increase in L.

Specifically, $k_\perp$ for the $TE_{m1}$ mode as seen through the twisted slots would be $\beta_{m1} + \alpha m$, which must equal $\beta_{02}$ for efficient coupling. Since $|\beta_{m1}|$ can be made less than $|\beta_{02}|$, $B_z$ can be increased and L reduced, since $B_z$ is proportional to $k_{\perp m1}^{3/2}/\beta_{m1}^{\frac{1}{2}}$. This effect can reduce the factor multiplying L for a rotating wave from $(2)^{\frac{1}{2}}$ to about 1.1 in typical cases.

Thus, the above statements in respect to mechanical tolerances are substantially correct in this case also.

Coaxial Window

Calculation of the thermal stresses in the coaxial window 82 requires a determination of the temperature distribution in the window, from which stresses can be calculated using handbook formulas. A planar approximation can be used for the calculation of the radial temperature distribution, and although the axial standing wave in the window 82 does cause minima and maxima in the axial distribution, the wavelength is so small in the dielectric that an average value may be used. There is no angular dependence, because the $TE_{On}$ mode is symmetric.

The problem as so stated is one-dimensional, and letting $d=(r'-q')$, the heat input at a position $\rho$ is given by $$W(\rho)=(W_0 4/d)\sin^2(n-1)\pi(\rho-q')/d \quad (16)$$

where $\rho$ is the radial coordinate, and $W_0$ is the total heat flux to each edge in watts/cm². The temperature is then $$T(\rho)-T(q')=(W_0/\theta)[(\rho-q')-(\rho-q')^2/d+d(1-\cos 2\pi(n-1)(\rho-q')/d)/(2(n-1)\pi^2)] \quad (17)$$

where $\theta$ is the thermal conductivity of the material. The peak temperature is at $\rho_0=(r'+q')/2$, $$T(\rho_0)-T(q')=(W_0/\theta)[d/4+d(1-\cos(n-1)\pi)/(2(n-1)^2\pi^2)]. \quad (18)$$

The maximum stress, which is azimuthal at $\rho=r'$ and $\rho=q'$, is approximately $$\sigma_\theta \cong [T(\rho_0)-T(q')]E\alpha/(1-\nu), \quad (19)$$

where we assume $T(r')=T(q')$, and E is Young's modulus, $\alpha$ is the linear coefficient of expansion, and $\nu$ is Poisson's ratio, all for the material of interest. (Reference: W. Flugge, Handbook of Engineering Mechanics, McGraw-Hill, 1962, p. 43-13, Eq. 43-73).

The maximum stress is therefore directly proportional to both d and $W_0$, and can be made arbitrarily small for a given power by reducing d or $W_0$ (by increasing r'). The reduction in d is limited by $d>(n-1)\lambda_0/2$, to avoid cutoff (in vacuum), and by breakdown of air, the latter depending on the power level. There is no fundamental limitation on r'.

As a numerical example, for 94 GHz, and with beryllium oxide as the window material, as is commonly used because of its excellent heat conductivity, the various values are $\theta=1.32$ W/cm² °C./cm, $\alpha=9\times 10^{-6}/°C.$, $E=40\times 10^6$ psi, and $\nu=0.25$. The power loss in the dielectric is $P_l=0.6 P_0 N\pi \tan\delta$, where $P_0$ is the input microwave power, $\tan\delta$ is the loss tangent of the material ($8\times 10^{-4}$ for BeO at 100 GHz), N is the number of axial half wavelengths of window thickness, and the factor of 0.6 comes from the effect of the standing wave in the window. For $P_0=10^6$ watts, for example, $P_l=3$ kW for N=2. Assuming a 6 inch diameter, and $(r'-q')=0.170$ inches, $W_0=253$ W/cm². Then $T(\rho_0)-T(q')=29°$ C., and $\sigma_\theta=9300$ psi, which is within acceptable limits for BeO. The peak electric field, using Poynting's theorem, is $$E_0=15.49[(P_0 r'(1-(\lambda_0/2d)^2)^{-1}/d]^{\frac{1}{2}} V/m \quad (20)$$

in the planar approximation, dimensions in meters. The peak field is then $8.9\times 10^3$ V/cm for the above case, which is reasonable in air.

If higher peak power is required, the peak electric field can be lowered by increasing the major radius r' and/or increasing d. If d is increased, the peak power handling capability increases while the average power capability decreases. The increase in r' presents no apparent problem except size, but the tapers can be short, as indicated previously.

Elimination of Mode Competition

The output window 82 and the coupling section 60 are most easily adapted to a microwave source such as a gyrotron which uses a coaxial interaction cavity operating in a $TE_{m1}$ mode. All physical principles and analyses applicable to hollow cavity gyrotrons could be directly applied to coaxial gyrotrons. The mean radius of the cavity $R_0=(a+b)/2$ can be made large, accommodating a high current annular electron beam, but with the number of possible cavity modes increasing only as $R_0$ rather than $R_0^2$, as in a hollow cavity. The problem of mode competition, which imposes a serious limit on cavity size, and hence beam current and output power, of existing gyrotron designs would thereby be alleviated.

However, if $R_0/\lambda_0$ is larger than about 5, which might be required for very high power, mm wavelength gyrotrons, mode competition could again cause difficulty. The apparatus of FIG. 1 can be used to enhance the Q of the desired mode, by taking advantage of the mode selectivity of the coupling apparatus. This is especially advantageous in the coaxial geometry because the Q's of the $TE_{m'1}$ modes, the only competing modes, would be roughly the same for the nearby values of m', so that doubling the Q of the desired mode would be entirely adequate.

Q enhancement is accomplished by introducing a discontinuity in the output waveguide 64 (which may be for the $TE_{02}$ mode) after the coupling section 60 and before the window 82. Such a discontinuity could consist of a symmetric iris 84 in the $TE_{02}$ mode waveguide. The reflected power would then return to the coupling section 60, be converted to the $TE_{m1}$ mode in the waveguide 54 by the slots 62, the coupler being a reciprocal device, and continue back via the waveguide 52 to the cavity 50. If the wave returns with the proper phase, the Q of the mode will be enhanced. This Q enhancement can be made mode selective because the coupler, if designed to pass the $TE_{m1}$ mode, can reject the $TE_{m-1,1'}$ etc. modes, so that they continue along with the electron beam 48 into the collector 46. If the collector 46 is made to act as a good absorber, which is not difficult because of its large volume relative to the coaxial waveguide 54, the undesired modes will not be reflected back via the waveguide 54 to the cavity 50. Waves entering the collector 46 will become trapped there and be well absorbed by multiple reflections, if part of the wall is lossy, because the number of modes that can exist in the waveguide 54 compared to the collector 46 is proportional to their relative areas.

Figure 6:
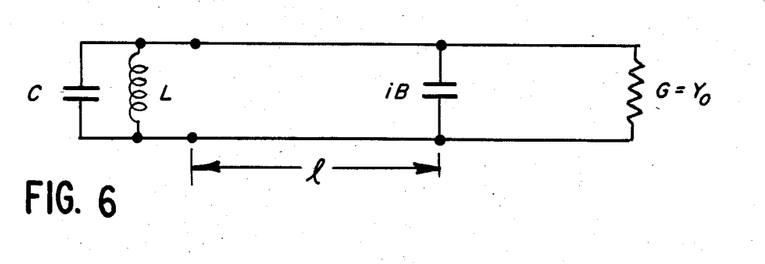
FIG. 6 is an equivalent circuit diagram of a transmission line equivalent to the cavity resonator-waveguide system shown in FIG. 1.

This Q enhancement can be demonstrated quantitatively by reference to the transmission line equivalent of the cavity resonator-waveguide system shown in FIG. 6. The transmission line of admittance $Y_o$ is assumed to be matched by a load $G=Y_0$. The discontinuity having susceptance iB is then directly paralleled by conductance $G=Y_0$. At the resonator the admittance $Y_0+iB$ appears as $$\frac{Y}{Y_O} = \frac{Y_O + iB + iY_O\tan\beta l}{Y_O + i(Y_O + iB)\tan\beta l} \quad (21)$$

$\beta$ being the propagation constant and l the distance to the discontinuity. In particular, let $\beta l=(2n-1)\pi/2$, n being an integer, so that $Y=Y_o^2/(Y_0+iB)$. If $B=0$, then $Q=\omega_0 C/Y_0 = 1/\omega_0 L Y_0$, which is assumed $>>1$. If instead, $B=Y_0$, for example, which is equivalent to 10% reflected power from the discontinuity, then $Y=Y_0/2 - iY_0/2$. Q is then $\omega_0 C(Y_0/2)$, twice the previous value, while $\omega_0$ is little changed, since $iY_o/2 << i\omega_0 C$. The condition $Bl=(2n-1)\pi/2$ was chosen because it gives the largest change in Q. The fact that the required reflected power would in practice be coupled through the coupler 60 does not affect the conclusions concerning the magnitude of reflected power required for a given change of Q.

The effect of the coupler, designed to convert the $TE_{m1}$ mode in the outer waveguide 54 to the $TE_{02}$ mode in the inner waveguide 64, becomes important when considering $TE_{m'1}$ modes, $m'\neq m$. For example, if the coupler passes only 50% of the power in a $TE_{m'1}$ mode in each direction, then its Q enhancement will only be $\frac{1}{4}$ that of the $TE_{m1}$ mode.

In order to determine the discrimination against a $TE_{m'1}$, it is necessary to observe that for the waveguide near cutoff cavities (open cavities) normally used with gyrotrons, the resonant frequency is very close to being given by $\omega_0/c=k_c$, $k_c$ being the cutoff wave number of the mode of interest. Thus the frequency separation of the $TE_{m1}$ and $TE_{m-1,1}$ modes is $$\Delta\omega/\omega = (mR_0 - (m-1)/R_0)/(m/R_0) = 1/m, \quad (22)$$

where m could easily be close to 100.

As discussed above, for substantially complete coupling, $\beta_{m1}$ is the outer waveguide 54 (seen as $\beta_{m1}+\beta m$ through the slots 62 because of the slot helicity) must equal $\beta_{0n}$ in the inner waveguide 64 at the frequency $\omega_0 \simeq cm/R_0$, where $R_0$ is the mean cavity radius, so we must have $\beta_{02}=\beta_{m1}+\alpha m$. Then $$\beta_{m1} = [(m/R_o)^2 - (m/R)^2]^{\frac{1}{2}}, \quad (23)$$

R being the mean radius of waveguide 54.

A nearby $TE_{m'1}$ mode would oscillate at $\omega'_0 = cm'/R_0$, giving $\beta_{m'1}=(m'/m)\beta_{m1}$. Because the coupler was designed for the $TE_{m1}$ mode, it has m slots 62, so that the $TE_{m'1}$ mode appears as a $TE_{m'-m,2}$ mode in the waveguide 64. Assuming $m'-m<<m$, which are the modes which cause trouble, $\beta_{m'-m,2}=\beta'_{02}$ to a high accuracy because $|r-q| << (r+q)/2$, where $\beta'_{02}$ is the wave number of the $TE_{02}$ mode at frequency $\omega'_0$. The mismatch in wave number as seen in the waveguide 64 is $$\Delta\beta = \beta'_{02} - (\alpha m' + \beta_{m'1}) \simeq \beta_{02}\frac{(m'-m)}{m}\left[\frac{k_0^2}{\beta_{02}^2} - 1\right] \quad (24)$$

where $k_0=\omega_0/c$.

To discriminate adequately (<50% transmission) against the $TE_{m'1}$ mode, we should have $\Delta\beta L > \pi/2$, the worst case being $|m'-m|=1$.

An expression is given in Equation (11) for L required for substantially complete transfer from the desired $TE_{m1}$ mode. Equation (11) can be rewritten as $$L = f(\pi^2/2)\beta_{02}/(k_0^2 - \beta_{02}^2), \quad (25)$$

f being approximately the ratio of the circumference to total slot width. $\Delta\beta L > \pi/2$ then means $f > m/\pi$, which simply gives a maximum slot width. Narrower slots and longer coupling lengths are also less likely to produce undesired reflections. This approach eliminates a mode competition problem that is a feature of all devices having interaction regions large in radius compared to the operating wavelength.

Although certain preferred embodiments of the invention have been described in some detail, various modifications thereof may be made within the scope of the invention. For example, rather than utilize an iris 84 for reflecting microwave energy to stabilize the input mode, other partial reflectors might be used. By making the thickness of the window 82 other than an integral multiple of half wavelengths, the window itself may function as a partial reflector.

In the case of reflection of the transferred mode in the output waveguide 64, a stationary $TE_{m1}$ mode may be produced which may utilize the purely axial slots 62' as shown in FIG. 5.

What is claimed is:

1. A cyclotron resonance maser system comprising:
   an assembly of components disposed successively along a common axis and including successively and coaxially an annular source of electrons, tunnel means for defining a beam tunnel symmetrically disposed about said axis, interaction means for defining an electron-microwave interaction region symmetrically disposed about said axis, a first coaxial waveguide coupled to said interaction means, and an annular collector of electrons,
   means for forming electrons from said source into an annular beam of electrons having substantial energy transverse of said beam and directing said beam of electrons successively through said beam tunnel, said interaction region and said coaxial waveguide to said collector,
   a second coaxial waveguide coaxial with and surrounded by said first coaxial waveguide and extending coaxially through said electron collector, and
   symmetric coaxial coupling means for coupling microwave energy between said first and second coaxial waveguides.

2. A cyclotron resonance maser system according to claim 1 wherein said coaxial coupling means includes a common wall between said first and second waveguides, said wall being penetrated by substantially axial elongated slots substantially equally spaced around said axis at a common axial location.

3. A cyclotron resonance maser system according to claim 2 wherein the respective sides of each slot are substantially parallel to one another and each of said slots terminates in a narrowing taper at each end.

4. A cyclotron resonance maser system according to claim 2 wherein said slots have a helical twist for coupling a rotating wave to a symmetric wave.

5. A cyclotron resonance maser system according to claim 1 wherein said coaxial coupling means comprises a mode selective directional coupler for coupling a $TE_{m1}$ mode in said first waveguide to a $TE_{0n}$ mode in said second waveguide, m being an integer large compared to 1 and n being an integer greater than 1, said second waveguide propagating said $TE_{0n}$ mode and containing means for partially reflecting microwaves in said $TE_{0n}$ mode back through said coupler for reinforcing the desired $TE_{m1}$ mode in said first waveguide.

6. A cyclotron resonance maser system according to claim 5 wherein n is 2.

7. A cyclotron resonance maser system according to claim 5 wherein said directional coupler comprises a common wall between said first and second waveguides, said wall being penetrated by m substantially axial elongated slots.

8. A cyclotron resonance maser system according to claim 5 wherein said common wall has a thickness substantially equal to an odd multiple of one-fourth the cutoff wavelength of the mode going through said coupler.

9. A cyclotron resonance maser system according to claim 1 further comprising an annular window member for hermetically sealing said second waveguide and transmitting microwave energy.

10. A cyclotron resonance maser system according to claim 9 further including means for cooling the inner and outer edges of said annular window member.

11. A cyclotron resonance maser system according to claim 9 wherein said coaxial coupling means includes a common wall between said first and second waveguides, said wall being penetrated by substantially axial elongated slots substantially equally spaced around said axis at a common axial location.

12. A cyclotron resonance maser system according to claim 11 wherein the respective sides of each slot are substantially parallel to one another and each of said slots terminates in a narrowing taper at each end.

13. A cyclotron resonance maser system according to claim 11 wherein said slots have a helical twist for coupling a rotating wave to a symmetric wave.

14. A cyclotron resonance maser system according to claim 9 wherein said coaxial coupling means comprises a mode selective directional coupler for coupling a $TE_{m1}$ mode in said first waveguide to a $TE_{0n}$ mode in said second waveguide, m being an integer large compared to 1 and n being an integer greater than 1, said second waveguide propagating said $TE_{0n}$ mode and containing means for partially reflecting microwaves in said $TE_{0n}$ mode back through said coupler for reinforcing the desired $TE_{m1}$ mode in said first waveguide.

15. A cyclotron resonance maser system according to claim 14 wherein said means for partially reflecting microwaves comprises said window member.

16. A cyclotron resonance maser system according to claim 14 wherein n is 2.

17. A cyclotron resonance maser system according to claim 14 wherein said directional coupler comprises a common wall between said first and second waveguides, said wall being penetrated by m substantially axial elongated slots.

18. A cyclotron resonance maser system according to claim 14 wherein said common wall has a thickness substantially equal to an odd multiple of one-fourth the cutoff wavelength of the mode going through said coupler.

19. A cyclotron resonance maser system comprising:
an assembly of components disposed successively along a common axis and including successively and coaxially an annular source of electrons, tunnel means for defining a beam tunnel symmetrically disposed about said axis, cutoff means, cavity means for defining a microwave resonant cavity symmetrically disposed about said axis, transition means for defining a transition passage symmetrically disposed about said axis, a first coaxial waveguide coupled to said transition means, and an annular collector of electrons, said cutoff means providing an annular opening between said cavity to said beam tunnel for admitting electrons from said beam tunnel to said resonant cavity while cutting off microwaves resonant in said cavity from entering said beam tunnel, means for forming electrons from said source into an annular beam of electrons having substantial energy transverse of said beam and directing said beam of electrons successively through said beam tunnel, said cutoff means, said cavity, said transition passage, and said coaxial waveguide to said collector, a second coaxial waveguide coaxial with and surrounded by said first coaxial waveguide and extending coaxially through said electron collector, and coaxial coupling means for coupling microwave energy between said first and second waveguides.

20. A cyclotron resonance maser system according to claim 19 wherein said coaxial coupling means includes a common wall between said first and second waveguides, said wall being penetrated by substantially axial elongated slots.

21. A cyclotron resonance maser system according to claim 20 wherein the respective sides of each slot are substantially parallel to one another and each of said slots terminates in a narrowing taper at each end.

22. A cyclotron resonance maser system according to claim 20 wherein said slots have a helical twist for coupling a rotating wave to a symmetric wave.

23. A cyclotron resonance maser system according to claim 19 wherein said coaxial coupling means comprises a mode selective directional coupler for coupling a $TE_{m1}$ mode in said first waveguide to a $TE_{0n}$ mode in said second waveguide, m being an integer large compared to 1 and n being an integer greater than 1, said second waveguide propagating said $TE_{0n}$ mode and containing means for partially reflecting microwaves in said $TE_{0n}$ mode back through said coupler for reinforcing the desired $TE_{m1}$ mode in said first waveguide.

24. A cyclotron resonance maser system according to claim 23 wherein n is 2.

25. A cyclotron resonance maser system according to claim 23 wherein said directional coupler comprises a common wall between said first and second waveguides, said wall being penetrated by m substantially axial elongated slots.

26. A cyclotron resonance maser system according to claim 23 wherein said common wall has a thickness substantially equal to an odd multiple of one-fourth the cutoff wavelength of the mode going through said coupler.

27. A cyclotron resonance maser system comprising:
an assembly of components disposed successively along a common axis and including successively and coaxially an annular source of electrons, tunnel means for defining a beam tunnel symmetrically disposed about said axis, cutoff means, cavity means for defining a microwave resonant cavity symmetrically disposed about said axis, transition means for defining a transition passage symmetrically disposed about said axis, a first coaxial waveguide coupled to said transition means, and an annular collector of electrons, said cutoff means providing an annular opening between said cavity to said beam tunnel for admitting electrons from said beam tunnel to said resonant cavity while cutting off microwaves resonant in said cavity from entering said beam tunnel, means for forming electrons from said source into an annular beam of electrons having substantial energy transverse of said beam and directing said beam of electrons successively through said beam tunnel, said cutoff means, said cavity, said transition passage, and said coaxial waveguide to said collector, a second coaxial waveguide coaxial with and surrounded by said first coaxial waveguide and extending coaxially through said electron collector, coaxial coupling means for coupling microwave energy between said first and second waveguides, and an annular window member for hermetically sealing said second waveguide and transmitting microwave energy.

28. A cyclotron resonance maser system according to claim 27 further including means for cooling the inner and outer edges of said annular window member.

29. A cyclotron resonance maser system according to claim 27 wherein said coaxial coupling means includes a common wall between said first and second waveguides, said wall being penetrated by substantially axial elongated slots substantially equally spaced around said axis at a common axial location.

30. A cyclotron resonance maser system according to claim 29 wherein the respective sides of each slot are substantially parallel to one another and each of said slots terminates in a narrowing taper at each end.

31. A cyclotron resonance maser system according to claim 29 wherein said slots have a helical twist for coupling a rotating wave to a symmetric wave.

32. A cyclotron resonance maser system according to claim 27 wherein said coaxial coupling means comprises a mode selective directional coupler for coupling a $TE_{m1}$ mode in said first waveguide to a $TE_{0n}$ mode in said second waveguide, m being an integer large compared to 1 and n being an integer greater than 1, said second waveguide propagating said $TE_{0n}$ mode and containing means for partially reflecting microwaves in said $TE_{0n}$ mode back through said coupler for reinforcing the desired $TE_{m1}$ mode in said first waveguide.

33. A cyclotron resonance maser system according to claim 32 wherein said means for partially reflecting microwaves comprises said window member.

34. A cyclotron resonance maser system according to claim 32 wherein n is 2.

35. A cyclotron resonance maser system according to claim 32 wherein said directional coupler comprises a common wall between said first and second waveguides, said wall being penetrated by m substantially axial elongated slots.

36. A cyclotron resonance maser system according to claim 32 wherein said common wall has a thickness substantially equal to an odd multiple of one-fourth the cutoff wavelength of the mode going through said coupler.

37. A cyclotron resonance maser system comprising:
an assembly of components disposed successively along a common axis and including successively and coaxially an annular source of electrons, tunnel means for defining a beam tunnel symmetrically disposed about said axis, cutoff means, cavity means for defining a microwave resonant cavity symmetrically disposed about said axis, transition means for defining a transition passage symmetrically disposed about said axis, a first coaxial waveguide coupled to said transition means, and an annular collector of electrons, said cavity being defined by inner and outer walls forming a cavity of transverse cross section monotonically increasing in area in the direction of said transition passage and with substantially constant average radius over the length of the cavity, said cutoff means providing an annular opening between said cavity and said beam tunnel of substantially smaller average radius than that of said cavity for resonating in a $TE_{m1}$ mode, wherein m is a predetermined integer substantially greater than 1, said first waveguide having at least a portion of substantially constant transverse cross section of average radius substantially greater than that of said cavity, and said transition passage having transverse cross section of average radius monotonically increasing from that at the output of said cavity to that at the input of said waveguide, means for forming electrons from said source into an annular beam of electrons having substantial energy transverse of said beam and directing said beam of electrons successively through said beam tunnel, said cutoff means, said cavity, said transition passage, and said coaxial waveguide to said collector, a second coaxial waveguide coaxial with and surrounded by said first coaxial waveguide and extending coaxially through said electron collector, and coaxial coupling means for coupling microwave energy between said first and second waveguides, said coaxial coupling means comprising a mode selective directional coupler for coupling said $TE_{m1}$ mode in said first waveguide to a $TE_{0n}$ mode in said second waveguide, n being an integer greater than 1, said second waveguide propagating said $TE_{0n}$ mode and containing means for partially reflecting microwaves in said $TE_{0n}$ mode back through said coupler for reinforcing the desired $TE_{m1}$ mode in said first waveguide.

38. A cyclotron resonance maser system according to claim 37 further comprising an annular window member for hermetically sealing said second waveguide and transmitting microwave energy.

39. A cyclotron resonance maser system according to claim 38 wherein said means for partially reflecting microwaves comprises said window member.

40. A cyclotron resonance maser system according to claim 38 further including means for cooling the inner and outer edges of said, annular window member.

41. A cyclotron resonance maser system according to claim 37 wherein n is 2.

42. A cyclotron resonance maser system according to claim 37 wherein said directional coupler comprises a common wall between said first and second waveguides, said wall being penetrated by m substantially axial elongated slots.

43. A cyclotron resonance maser system according to claim 42 wherein said slots have a helical twist.

44. A cyclotron resonance maser system according to claim 37 wherein said common wall has a thickness substantially equal to an odd multiple of one-fourth the cutoff wavelength of the mode going through said coupler.

* * * * *

UNITED STATES PATENT AND TRADEMARK OFFICE
CERTIFICATE OF CORRECTION

PATENT NO. : 4,604,551                                Page 1 of 3
DATED : August 5, 1986
INVENTOR(S) : Charles P. Moeller It is certified that error appears in the above-identified patent and that said Letters Patent is hereby corrected as shown below:

In the Abstract
    Line 15, change "$TE_{On}$" to --$TE_{0n}$--;
    Line 16, change "$TE_{m\ell}$" to --$TE_{ml}$--;
    Line 16, change "$TE_{On'}$" to --$TE_{0n'}$--;
    Line 19, change "$TE_{m\ell}$" to --$TE_{ml}$--.
Column 1, line 32, delete the period after "MTT-25";
         line 41, insert a quotation mark after "amplifier,";
         line 41, delete the quotation mark before "Int.";
         line 41, delete the quotation mark after "Electronics".
Column 3, line 67, change "magnetion" to --magnetron--.
Column 5, line 29, change "$TE_{on'}$" to --$TE_{0n'}$--.
Column 6, line 26, change "$\omega \cong ck_{195ml}$" to --$\omega \cong ck_{\perp ml}$--;
         line 30, change "$Q \cong 4\pi l^2/\lambda_0^2$" to --$Q \cong 4\pi \ell^2/\lambda_0^2$--;
         line 32, change "l" to --$\ell$--;
         line 36, change "spae" to --space--.
Column 7, line 21, change "$TE_{0n'}$" to --$TE_{0n'}$--.
Column 8, line 61, change "$TE_{on}$" to --$TE_{0n}$--;
         line 63, change "$TE_{On'}$" to --$TE_{0n'}$--;
         line 63, after "$TE_{Mn'}$" insert a comma.
Column 9, line 61, after "thereof." insert the beginning of a
   paragraph --The coupling length L is then--.

UNITED STATES PATENT AND TRADEMARK OFFICE
CERTIFICATE OF CORRECTION

PATENT NO. : 4,604,551   Page 2 of 3

DATED : August 5, 1986

INVENTOR(S) : Charles P. Moeller

It is certified that error appears in the above-identified patent and that said Letters Patent is hereby corrected as shown below:

Column 10, line 12, change "$(\eta^2/4)$" to --$(\pi^2/4)$--
in Equation (14);

line 15, change "$\lambda d$" to --$\Delta d$--;

line 26, change "$\beta_{ml}=(k_0^2-k_{195}^2)^{1/2}$" to --$\beta_{ml} = (k_0^2 - k_\perp^2)^{1/2}$-- in Equation (15);

line 29, raise "$=\pi/(b-a)$" from subscripts;

line 29, change "for the TE02" from subscript italics to --for the $TE_{02}$--.

Column 11, line 6, change "$TE_{On}$" to --$TE_{0n}$--;

line 11, move "(16)" to column margin;

line 27, after "$\sigma_\theta$" insert -- = -- in Equation (19);

line 45, change "°C./cm" to --C°/cm--;

line 45, change "$10^{-6}/°C.$" to --$10^{-6}/C°$--.

Column 12, line 58, change "$Y_O$" to --$Y_0$--;

lines 64-65, change "$Y_O$" to --$Y_0$--, all five occurrences;

lines 64-65, change "$\beta 1$" to --$\beta \ell$--, both occurrences;

line 67, change "1" to --$\ell$--;

line 68, change "$\beta 1$" to --$\beta \ell$--.

UNITED STATES PATENT AND TRADEMARK OFFICE
CERTIFICATE OF CORRECTION

PATENT NO. : 4,604,551

DATED : August 5, 1986

INVENTOR(S) : Charles P. Moeller

It is certified that error appears in the above-identified patent and that said Letters Patent is hereby corrected as shown below:

Column 13, line 1, change "$Y_o^2$" to --$Y_0^2$--;

line 6, change "$iY_o/2$" to --$iY_0/2$--;

line 7, change "$\beta 1$" to --$\beta \ell$--;

line 31, change "$\beta m$" to --$\alpha m$--;

line 36, change "$R_o$" to --$R_0$--;

line 41, change "$\beta_{m\ell}$" to --$\beta_{m1}$--.

Signed and Sealed this

Twenty-third Day of December, 1986

*Attest:*

DONALD J. QUIGG

*Attesting Officer*     *Commissioner of Patents and Trademarks*